United States Patent [19]
Hulten

[11] 3,848,916
[45] Nov. 19, 1974

[54] BUMPER ASSEMBLY
[75] Inventor: Richard E. Hulten, Durham, N.H.
[73] Assignee: McCord Corporation, Detroit, Mich.
[22] Filed: Jan. 18, 1973
[21] Appl. No.: 324,721

[52] U.S. Cl................ 293/88, 293/63, 267/139
[51] Int. Cl. ............................................ B60r 19/08
[58] Field of Search ............ 267/139, 140; 114/219; 293/1, DIG. 5, 60, 63, 70, 71 R, 85, 86, 87, 88, 89, 98, 99

[56] References Cited
UNITED STATES PATENTS
| | | | |
|---|---|---|---|
| 2,965,403 | 12/1960 | Barenyi et al. | 293/63 |
| 3,181,849 | 5/1965 | Mitchell | 267/140 |
| 3,575,454 | 4/1971 | Meeker | 293/71 R |
| 3,610,609 | 10/1971 | Sobel | 293/60 |
| 3,695,665 | 10/1972 | Matsuura | 293/98 |

FOREIGN PATENTS OR APPLICATIONS
1,289,441   2/1969   Germany ........................ 293/99

Primary Examiner—M. Henson Wood, Jr.
Assistant Examiner—Robert Saifer
Attorney, Agent, or Firm—McGlynn and Milton

[57] ABSTRACT

An energy absorbing bumper assembly including a shell member or valance having apertures therein and yieldable bumper members for absorbing impact energy located within those apertures. The shell member or valance has spring-like members disposed on the rearward surface thereof such that it will deflect upon impact and thus allow the yieldable bumper members to absorb impact energy. The assembly may be provided with a two-tone appearance, the shell member being one color, such as the color of the automobile to which the assembly is secured, and the bumper members being another color such as black.

6 Claims, 7 Drawing Figures

BUMPER ASSEMBLY

This invention relates to an energy absorbing bumper assembly and more particularly to an energy absorbing bumper assembly for vehicles, the assembly rendering a vehicle more safe by absorbing and distributing energy upon impact of the vehicle bumper with a foreign object. Still more particularly, this invention relates to an energy absorbing bumper assembly having as a part thereof a molded valence panel or shell which may be finished in such a manner as to be compatible with the body surface of the vehicle to which the assembly is attached.

Recently, in an effort to provide bumpers better suited to absorb impact energy, various assemblies, including those consisting of a resilient or deformable shock absorbing member affixed in some manner to the vehicle to be protected, have been developed. Many of these assemblies, however, provide an unsightly and bulky appearance. Several automobile manufacturers have recently, in an effort to improve the appearance of such assemblies, sought designs of such a nature that a major portion of the bumper assembly appears to be merely a continuation of the automobile body, even to the extent of being painted body color.

In many instances, it is desirable to provide an assembly having a two-tone paint design, an energy absorbing portion being of one color such as black and a body portion being of the same color as the body of the automobile. However, this creates production difficulties in that it requires either a two-tone painting of an assembly or selective painting of portions thereof which in turn results in an increased expense. The problem is particularly acute when the entire assembly comprises a shell formed of a foamed plastic material such as microcellular polyurethane foam inasmuch as the painting process required to provide a two-tone body involves a baking step which causes the loss of desirable properties in the foamed plastic material.

Thus, it is necessary to develop a bumper assembly which can be produced without the necessity of selective or two-tone painting and, yet, which will provide the optical appearance desired while maintaining its ability to absorb and distribute impact energy.

Accordingly, it is an object of this invention to provide a bumper assembly which exhibits a two-tone appearance without the expense and technical difficulties incurred in a two-tone painting process of an integral bumper assembly.

A further object of the invention is to provide an energy absorbing bumper assembly comprising a shell member having one or more apertures therein and bumper means for absorbing impact energy disposed within those apertures, the shell member or valence being adapted to deflect on impact and thus allowing only the bumper means to absorb impact energy.

It is a still further object of this invention to provide such an energy absorbing bumper assembly wherein the shell member or valence includes spring means in the form of flexible straps which extend along the rearward surface thereof.

Other objects and attendant advantages of the instant invention will be readily appreciated as the same becomes better understood by reference to the following detailed description when considered in connection with the accompanying drawings wherein.

Figure 1:
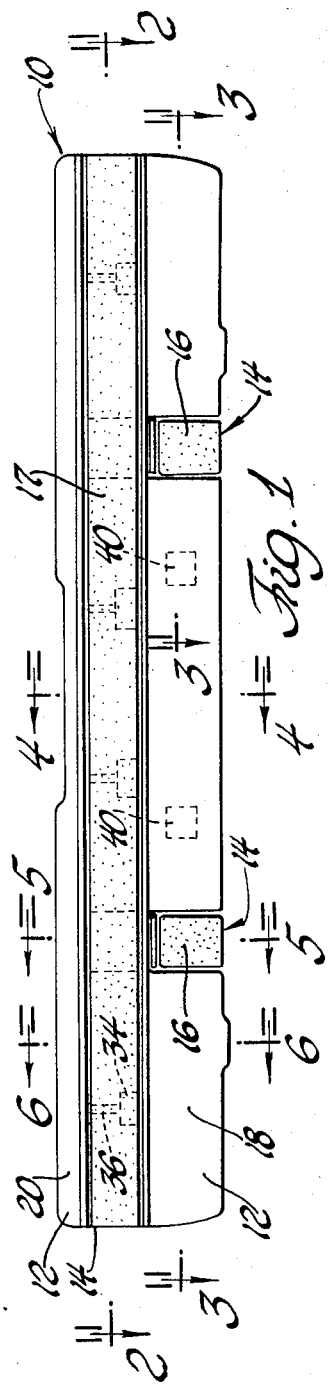
FIG. 1 is a perspective view of a bumper assembly for the rear surface of an automobile.

Referring now to the drawings in more detail, an energy absorbing bumper assembly is generally shown at 10 in FIGS. 1 through 7. The energy absorbing assembly 10 includes a shell member or valence 12 having apertures 14 therein and bumper means 16 and 17 disposed within the apertures and extending therethrough.

The shell member 12 comprises a valence or panel member which extends substantially over the portion of the rear or front surface of the vehicle which is to be protected. The valence or panel member has a surface profile similar to the body sheet metal of the vehicle and may be painted a color which coordinates with or matches the vehicle body. As shown most clearly in FIGS. 1, 4, 6, and 7 the shell 12 of the illustrated assembly includes a first panel section 18 disposed along the lower portion of the bumper assembly and a second panel section 20 disposed along the upper portion of the assembly. The panel 20 serves as a lip or member to more or less match with the body of the automobile and cover any aperture between the bumper means and the body surface. As may be noted in FIGS. 4 through 6, this bumper panel or lip has attached thereto a horizontal member 22 extending rearwardly toward the point of attachment to a support means 30. As may be further noted in FIGS. 4 through 6, the valence or shell member also includes a portion 24 which extends under the bumper means 17 laterally across the entire width of the bumper assembly.

Spring means or spring-like members 26 are integrally attached periodically along the width of the bumper assembly to the member 24 extending beneath the bumper means 17. This spring member is a flexible strap of material which is preferably integral with the valence or shell member 12 and extends from said member 24 to member 22 at the upper portion of the shell. This spring-like strap member is flexible and resilient in nature such that when the front surface of the bumper assembly is impacted in the area of the valence or shell member, the valence will move inwardly so as to allow the impact to be taken by the bumper means 16 and 17 and after impact restore itself to its original position.

Figure 4:
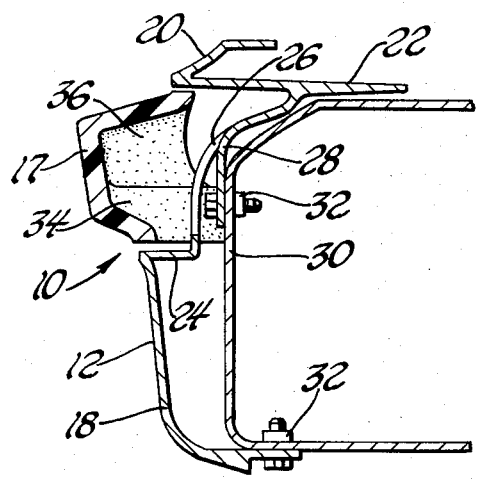
FIG. 4 is a vertical section taken along lines 4—4 of FIG. 1.

As may be noted in FIG. 4 a member 28 may extend from the spring-like member 26 in an integral fashion and serve to connect the valence or shell member 12 to a support means 30 by a bolt 32. Of course, these connecting members 28 may be spaced as desired laterally along the entire width of the valence or shell member and are not necessarily associated in each case with a spring-like member 26. The valence or shell member in the assembly shown is also secured at the lower portion of the bumper assembly by spaced bolts 32.

The entire valence or shell member, including the upper and lower panel sections 20 and 18 as well as the spring-like members 26 and the connecting members 28, is preferably formed integrally of a plastic material by injection molding. Any of a number of well-known plastic materials having sufficient hardness and being readily compounded so as to provide adequate flexibility in the final product may be employed to form the valence or shell member. Of course, those skilled in the art will recognize that certain resins are more readily adaptable for injection molding. The preferred resin for forming the specific valence or shell member 12 disclosed herein is acrylonitrile-butadiene-styrene copolymer.

The bumper means 16 and 17 serve to sustain an impact of the bumper assembly with a foreign body, the valence or shell member 12 being deflected upon impact as discussed above and the impact energy being absorbed and transmitted to the frame of the automobile by the bumper means. The bumper means are preferably formed of yieldable elastomeric material which is formed by molding or casting in the desired shape. It will be noted by referring to FIGS. 3 and 5 that both the bumper means 16 which comprise bumper guards and the bumper means 17 which comprises a rub rail portion of the bumper assembly are secured individually to the support 30 by bolts 32.

Any of the well-known resilient elastomeric materials including natural and synthetic rubbers may be employed to form the shell 12. Preferably, however, the yieldable material is a foamed plastic material. A preferred foamed plastic material is microcellular polyurethane foam, which is well-known in the prior art, having a thick skin which provides strength and surface protection. The microcellular foams produced by the preferred formulations possess thick sturdy skins which give the automotive bumper parts added strength and protect the interior foam structure from damage upon impact; furthermore, the skins have no pores and are, therefore, easily painted. The preferred formulation for the microcellular polyurethane is disclosed in U.S. Pat. No. 3,575,896 patented Apr. 20, 1971, and assigned to the assignee of this application. That formulation calls for a microcelullar polyurethane foam produced by reacting a prepolymer system which is made by reacting toluene diisocyanate with an organic diol and a catalyst system comprising a mixture of organic diols, blowing agents and organic metallic catalyst, an aromatic amine and a hydroxy compound. This composition, when employed in the production of bumper assemblies such as herein disclosed, may contain a pigmenting material such as carbon black to color the bumper portion formed therefrom black. Thus, it will be appreciated that by merely formulating the bumper means 16 and 17 of the polyurethane composition and fitting thereover the above-discussed valence or shell member 12, a two-tone bumper assembly is readily achieved.

Figure 2:
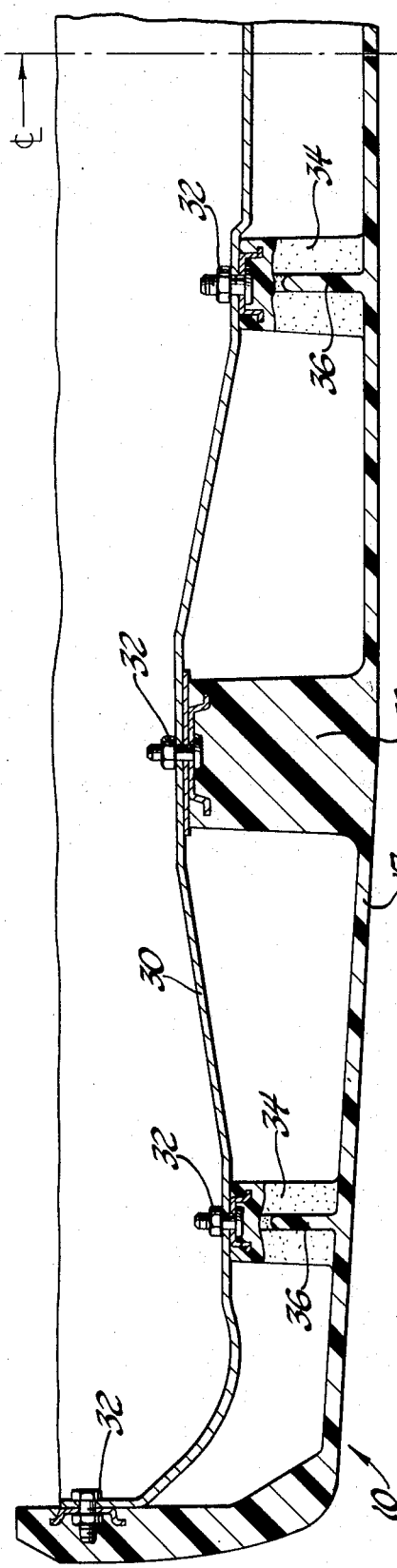
FIG. 2 is a horizontal section of the assembly taken along lines 2—2 of FIG. 1.
Figure 3:
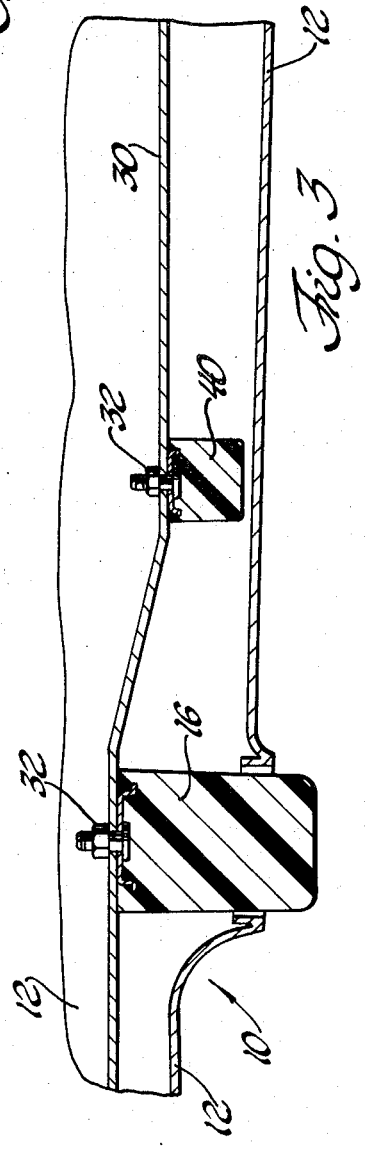
FIG. 3 is a horizontal section of the assembly of FIG. 1 taken along lines 3—3.
Figure 5:
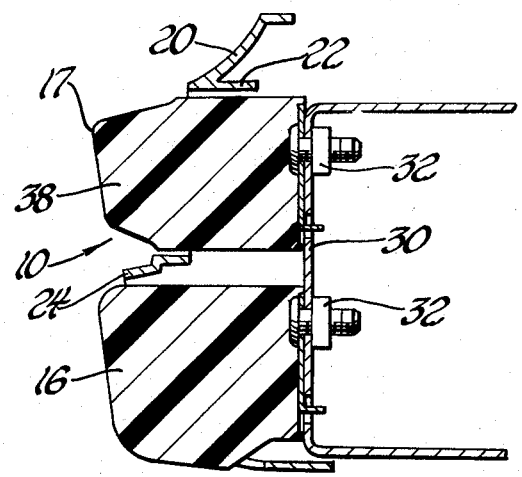
FIG. 5 is a vertical section taken along lines 5—5 of FIG. 1.
Figure 6:
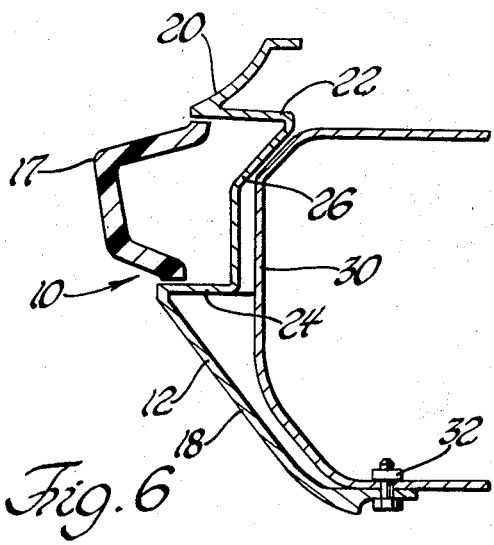
FIG. 6 is a vertical section taken along lines 6—6 of FIG. 1.
Figure 7:
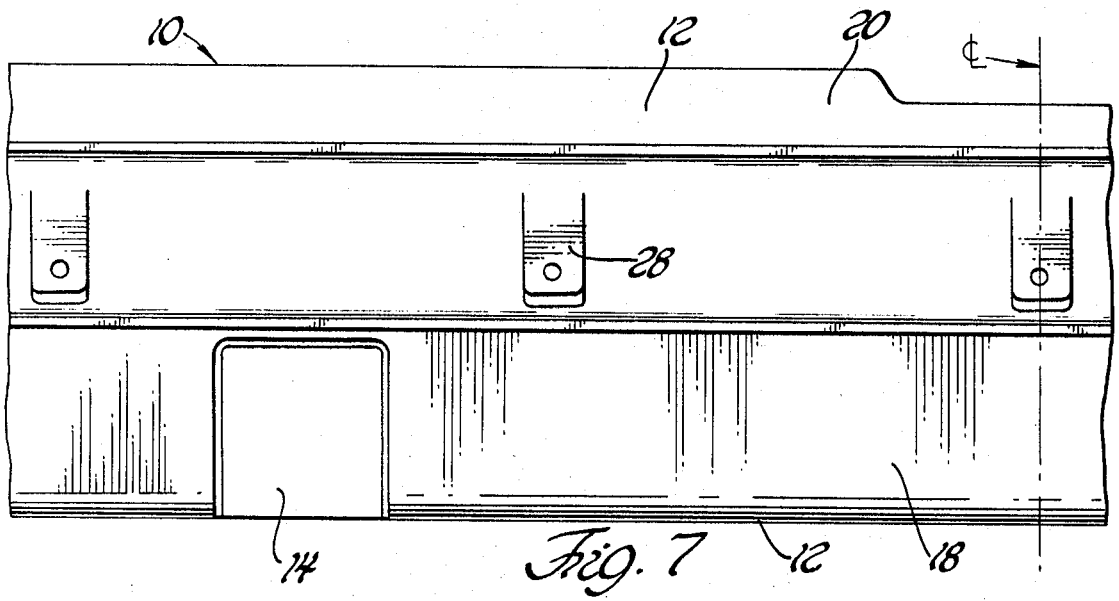
FIG. 7 is a perspective view of the shell or valence member of this invention taken from the interior thereof.

It may be noted by referring to FIG. 4, that the rub rail bumper means 17 of the illustrated assembly has, in the lower portion thereof, solid portions 34 of yieldable elastomeric material which serve as a medium through which the rub rail is connected by bolts 32 to support member 30. Extending upwardly from this portion 34 is a thin rib 36 of the same material which is integrally secured to the upper portion of the rub rail and which serves as a reinforcing member. These members 34 and 36 may be distributed as necessary along the length of the bumper assembly. Reference to FIGS. 2 and 5 will indicate that the rub rail portion of the bumper assembly also has integral portions 38 of yieldable material disposed inwardly thereof in portions directly above the bumper guards 16. These portions aid the bumper guards in absorbing impact energy upon collision with a foreign body.

The assembly shown in the drawings also includes auxiliary bumper guards 40 individually secured to the support member 30 and acting to absorb some of the impact when the valence or shell member 12 is impacted between bumper means 16.

The invention has been described in an illustrative manner and it is to be understood that the terminology used is intended to be in the nature of words of description rather than limitation. Obviously, many modifications and variations of the present invention are possible in light of the above teachings. For example, the particular bumper assembly may employ a valence or shell member 12 of any desired shape, having apertures therein and having bumper means protruding therethrough as is necessary to provide the protection needed.

It is, therefore, to be understood that the invention may be practiced otherwise than as specifically described above within the scope of the appended claims.

The embodiments of the present invention in which an exclusive property or privelege is claimed are defined as follows:

1. An energy absorbing bumper assembly comprising; an elongated plastic shell adapted to extend transversely of a vehicle, said shell member having at least one open aperture therein, plastic bumper means for absorbing impact energy disposed within said aperture and being exposed through said shell member, said shell member being adapted to deflect upon impact thereby to allow said bumper means to absorb the impact energy, a support member, said bumper means being independently secured to said support member, said shell member being secured to said support member, and said shell member including spring means disposed rearwardly thereof.

2. An assembly as set forth in claim 1 wherein said spring means comprise flexible straps which extend from a first portion of said shell member to another portion thereof.

3. An assembly as set forth in claim 2 wherein said straps are integral with said shell member and extend vertically relative thereto.

4. An assembly as set forth in claim 3 wherein said shell member is integrally molded plastic and said bumper means foamed plastic.

5. An assembly as set forth in claim 4 wherein said shell member is injection molded acrylonitrile-butadiene-styrene copolymer and the bumper means are microcellular polyurethane foam.

6. An assembly as set forth in claim 1 wherein said shell member is integrally molded plastic.

* * * * *